(12) United States Patent
Yamamoto et al.

(10) Patent No.: US 11,161,242 B2
(45) Date of Patent: Nov. 2, 2021

(54) METHOD FOR CONTROLLING ROBOT

(71) Applicant: Panasonic Intellectual Property Management Co., Ltd., Osaka (JP)

(72) Inventors: Ryosuke Yamamoto, Osaka (JP); Hiroyuki Nakata, Osaka (JP); Atsumi Hashimoto, Osaka (JP); Yasuyoshi Honuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 16/426,571

(22) Filed: May 30, 2019

(65) Prior Publication Data

US 2019/0275674 A1 Sep. 12, 2019

Related U.S. Application Data

(63) Continuation of application No. PCT/JP2017/024933, filed on Jul. 7, 2017.

(30) Foreign Application Priority Data

Dec. 16, 2016 (JP) .............................. JP2016-243916

(51) Int. Cl.
*B25J 9/16* (2006.01)
*B25J 13/00* (2006.01)

(52) U.S. Cl.
CPC ........... *B25J 9/1633* (2013.01); *B25J 9/1641* (2013.01); *B25J 9/1651* (2013.01); *B25J 9/1669* (2013.01); *B25J 9/1674* (2013.01); *B25J 13/00* (2013.01)

(58) Field of Classification Search
CPC ...... B25J 9/1633; B25J 9/1641; B25J 9/1638; B25J 13/085; B25J 19/02; B25J 9/1651;
(Continued)

(56) References Cited

U.S. PATENT DOCUMENTS

| 6,343,243 B1 * | 1/2002 | Brogardh | B25J 9/1638 |
| | | | 318/568.1 |
| 2015/0045952 A1 * | 2/2015 | Kosaka | B25J 9/16 |
| | | | 700/258 |

(Continued)

FOREIGN PATENT DOCUMENTS

| JP | 9-33369 | 2/1997 | |
| JP | H1148181 A * | 2/1999 | .............. B25J 13/08 |

(Continued)

OTHER PUBLICATIONS

International Search Report of PCT application No. PCT/JP2017/024933 dated Sep. 12, 2017.

(Continued)

*Primary Examiner* — Khoi H Tran
*Assistant Examiner* — Tanner L Cullen
(74) *Attorney, Agent, or Firm* — Wenderoth, Lind & Ponack, L.L.P.

(57) ABSTRACT

In a robot having a first rotary shaft and a second rotary shaft driven by respective motors and extending in the same direction, the second rotary shaft is rotated while vibrating the first rotary shaft that is holding a load directly or indirectly, thereby rotating the first rotary shaft relative to a load. This enables calculating the gravitational torque of the load applied to the first rotary shaft.

2 Claims, 8 Drawing Sheets

(58) Field of Classification Search
CPC ........ B25J 9/1674; B25J 9/1669; B25J 13/00; B25J 13/08; B25J 17/00; G05B 2219/39194; G05B 2219/40599; G05B 2219/41388; G05B 2219/39181; G05B 2219/37632; G01L 5/00
See application file for complete search history.

(56) References Cited

U.S. PATENT DOCUMENTS

| | | |
|---|---|---|
| 2015/0258685 A1 | 9/2015 | Matsumoto et al. |
| 2017/0043476 A1* | 2/2017 | Seo ........................ G05B 19/042 |
| 2018/0043549 A1* | 2/2018 | Su .......................... B25J 9/1676 |

FOREIGN PATENT DOCUMENTS

| | | | | |
|---|---|---|---|---|
| JP | 2005-211993 | 8/2005 | | |
| JP | 2010-076074 | 4/2010 | | |
| JP | 2010076074 A | * 8/2010 | ............. | B25J 13/00 |
| JP | 2011-235374 | 11/2011 | | |
| WO | 2014/021433 | 2/2014 | | |
| WO | 2016/185600 | 11/2016 | | |

OTHER PUBLICATIONS

Extended European Search Report dated Dec. 16, 2019 in European Patent Application No. 17880671.7.
Examination Report dated Aug. 27, 2021 in related Indian Patent Application No. 201947022124.

* cited by examiner

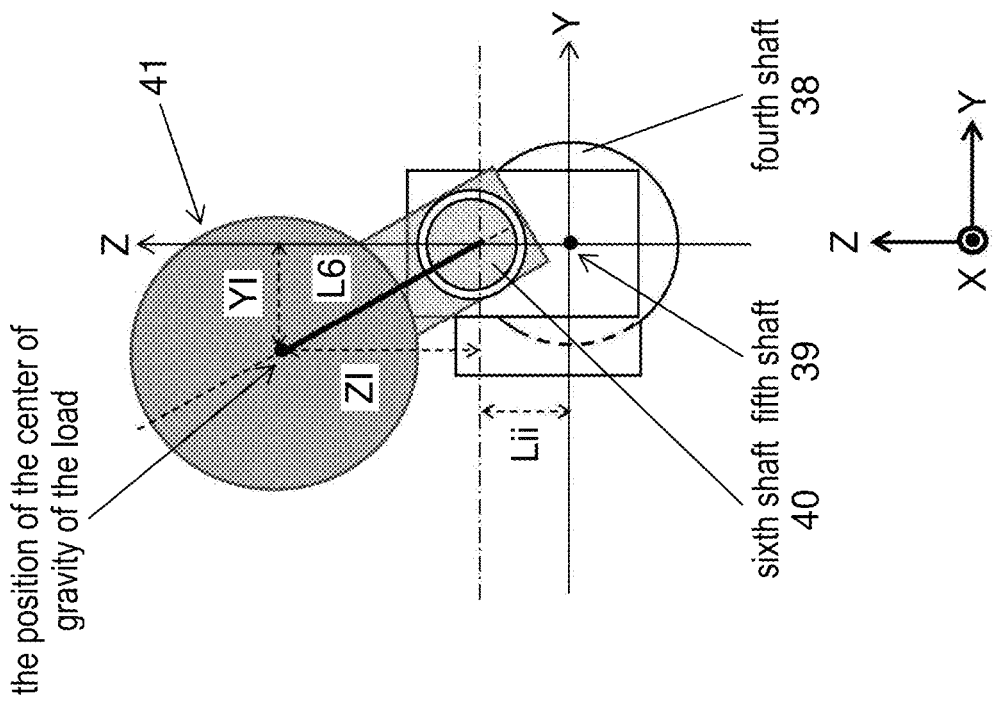
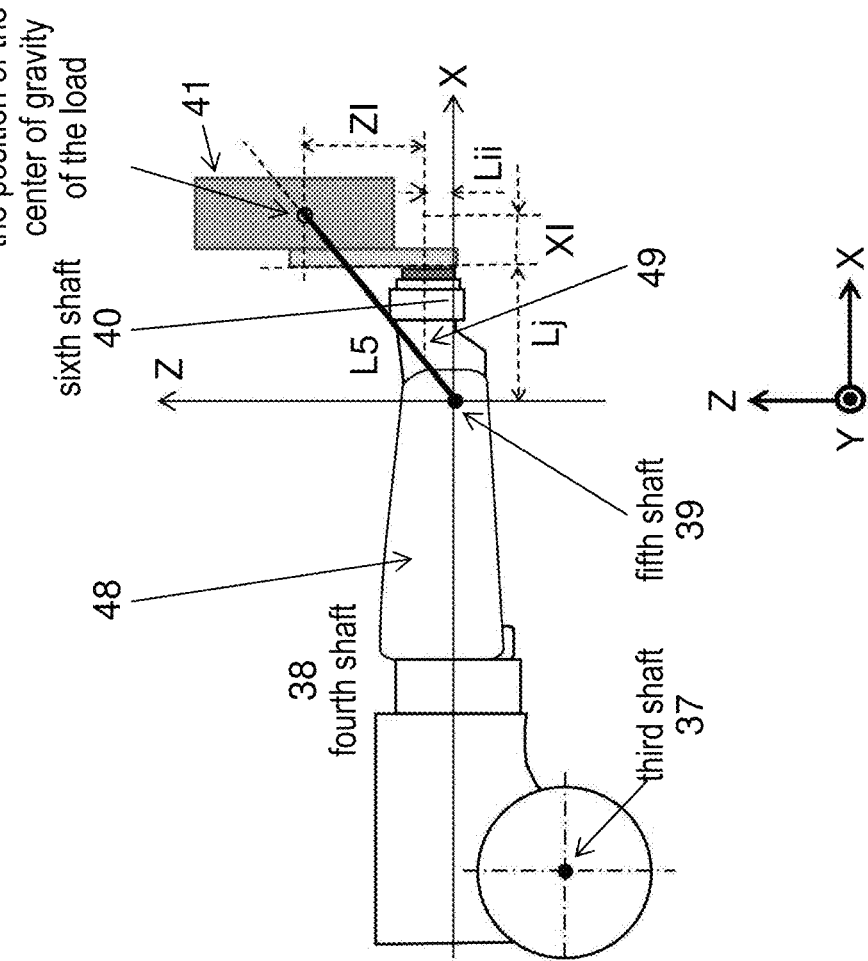

METHOD FOR CONTROLLING ROBOT

This application is a U.S. national stage application of the PCT International Application No. PCT/JP2017/024933 filed on Jul. 7, 2017, which claims the benefit of foreign priority of Japanese patent application No. 2016-243916 filed on Dec. 16, 2016, the contents all of which are incorporated herein by reference.

TECHNICAL FIELD

The present invention relates to a method for calculating the gravitational torque of a load applied to a motor-driven robot.

BACKGROUND ART

In recent years, there is a growing demand for robots with multiple motor-driven rotary shafts to be more sophisticated to improve safety and to cause less damage. These robots are expected to perform better movements and to cause less oscillation, thereby reducing cycle time and improving path-following performance. The robots are also expected to perform welding and other operations that should be precisely performed with higher quality.

These performance levels can be achieved by using information such as the mass and the position of the center of gravity of the robot arm and those of the load applied to the distal end of the arm. Of these pieces of information, the mass and the position of the center of gravity of the robot arm can be previously obtained from a CAD or other tools used in designing.

However, when a load is applied to the distal end of the robot arm, the robot should be aware of the mass and the position of the center of gravity of the load. To make the robot aware of this, the robot operator can manually enter the information into the robot controller.

Instead of manually entering the information, the load mass can be calculated from the difference in torque of each shaft of the motors between when the robot arm is at a standstill and the load is not applied, and when the load is applied and slightly lifted (e.g., Patent Literature 1).

Another approach to calculating the mass and the position of the center of gravity of the load is as follows. Two arms are rotated clockwise and counterclockwise at a constant angular velocity around two rotary shafts orthogonalized to each other. The magnitude of the gravitational torque with respect to the mass of the applied load and the length of the shortest straight line connecting the centers of the two rotary shafts are used for the calculation (e.g., Patent Literature 2).

CITATION LIST

Patent Literature

PTL 1: Japanese Unexamined Patent Application Publication No. 2011-235374
PTL 2: Japanese Unexamined Patent Application Publication No. 2010-76074

SUMMARY

Technical Problems

In the above case of manually entering the mass and the position of the center of gravity of the load, the robot operator should previously obtain these values by calculation or measurement. This may increase the burden on the operator or may cause the operator to forget to enter data or to make typing errors.

Meanwhile, in the above case of estimating the load mass from the difference in finger torque estimate between when the load is not applied, and when the load is applied and slightly lifted as shown in Patent Literature 1, the torque should be measured both when the load is applied and when it is not applied. In addition, fine-tuning should also be performed, while taking the direction of friction into consideration. This may increase the burden on the operator in charge of estimating the load.

In the above case disclosed in Patent Literature 2, the mass and the position of the center of gravity of the load is calculated from the gravitational torques applied to the two orthogonal shafts and the length of the shortest straight line connecting the two shafts while taking the direction of friction into consideration. In such a case, the estimation is performed by compensating the effects of dynamical and viscous frictions by the clockwise and counterclockwise rotations at a constant angular velocity. However, when these frictions have different effects depending on the rotation direction, the effects make the load estimation difficult.

An object of the present invention is to provide a method for controlling a robot capable of calculating the gravitational torque of a load even when dynamical and viscous frictions have different effects depending on the rotation direction.

Solutions to Problems

To solve the above problems, a method for controlling a robot according to the present invention is a method for controlling a robot including: a first rotary shaft and a second rotary shaft extending in the same direction; a first motor and a second motor configured to rotate the first rotary shaft and the second rotary shaft, respectively; and an arm configured to be rotated around the first rotary shaft and to hold a load directly or indirectly at the distal end of the arm. The method includes: rotating the second rotary shaft and vibrating the first rotary shaft so as to rotate the first rotary shaft relative to the load; and calculating the gravitational torque of the load applied to the first rotary shaft while the first rotary shaft is being rotated relative to the load in the step of rotating the second rotary shaft.

In the step of rotating the second rotary shaft, the second rotary shaft may be rotated at least 90 degrees at a constant angular velocity.

The method may further include equating the operating angle of the second rotary shaft with the operating angle of the first rotary shaft rotated relative to the load in the step of rotating the second rotary shaft so as to establish a correlation between the gravitational torque calculated in the step of calculating the gravitational torque and the operating angle of the second rotary shaft.

The robot may further include a third rotary shaft located between the first rotary shaft and the second rotary shaft, the third rotary shaft extending in a different direction from the first rotary shaft and the second rotary shaft. The step of calculating the gravitational torque including calculating the following: the gravitational torque of the load when the second rotary shaft is in a first position, the second rotary shaft having an operating angle equated with the operating angle of the first rotary shaft; and the gravitational torque of the load when the second rotary shaft is rotated to a third position, the third position being 90 degrees from the first position. The method may further includes: rotating the third rotary shaft clockwise and counterclockwise by at least 90 degrees at a constant angular velocity; calculating the following: the gravitational torque of the load when the third rotary shaft is rotated to a second position in the step of rotating the third rotary shaft; and the gravitational torque of the load when the third rotary shaft is rotated to a fourth position in the step of rotating the third rotary shaft, the fourth position being 90 degrees from the second position; and calculating the mass and the position of a center of gravity of the load by using the following: the gravitational torques of the load calculated when the second rotary shaft is in the first position and in the third position; the gravitational torques of the load calculated when the third rotary shaft is in the second position and in the fourth position; and the shortest inter-axis distance between the rotation center of the first rotary shaft and the rotation center of the third rotary shaft.

Advantageous Effects of Invention

The present invention enables calculating the gravitational torque of an applied load even when dynamical and viscous frictions have different effects depending on the rotation direction.

BRIEF DESCRIPTION OF DRAWINGS

FIG. 4A illustrates the robot viewed from the XZ plane as in FIG. 2 according to the exemplary embodiments of the present invention.

FIG. 4B illustrates the robot viewed from the YZ plane as in FIG. 3 according to the exemplary embodiments of the present invention.

DESCRIPTION OF EMBODIMENTS

A method for controlling a robot according to the present invention will be described as follows with reference to drawings.

First Exemplary Embodiment

Figure 2:
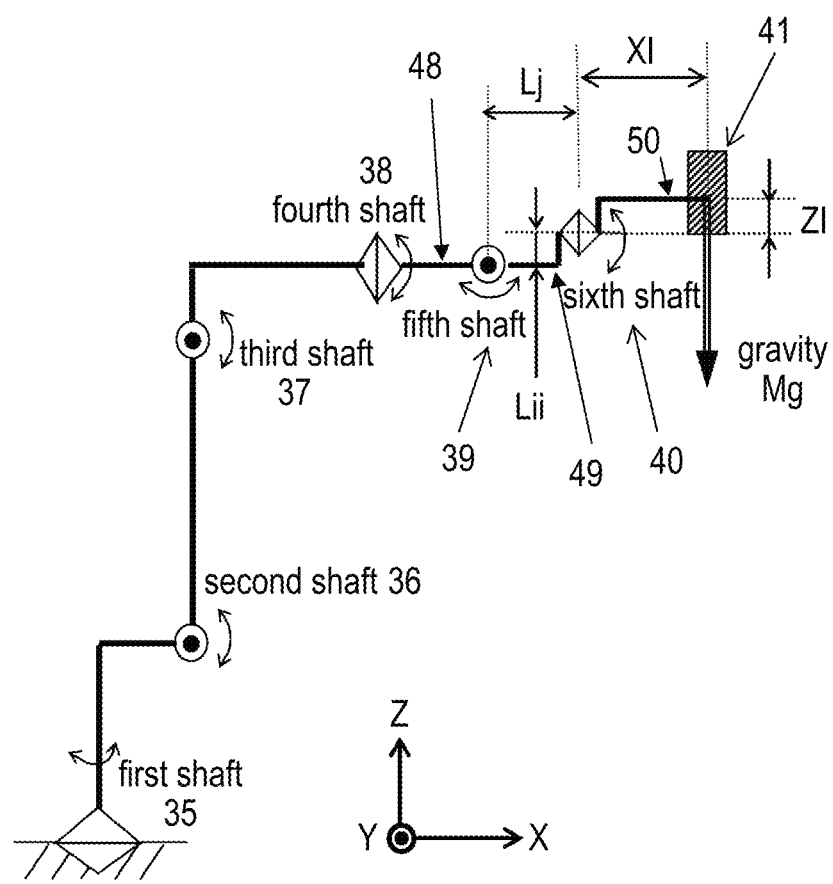
FIG. 2 shows an example of the placement of the rotary shafts of the robot in the XZ plane according to the exemplary embodiments of the present invention.
Figure 3:
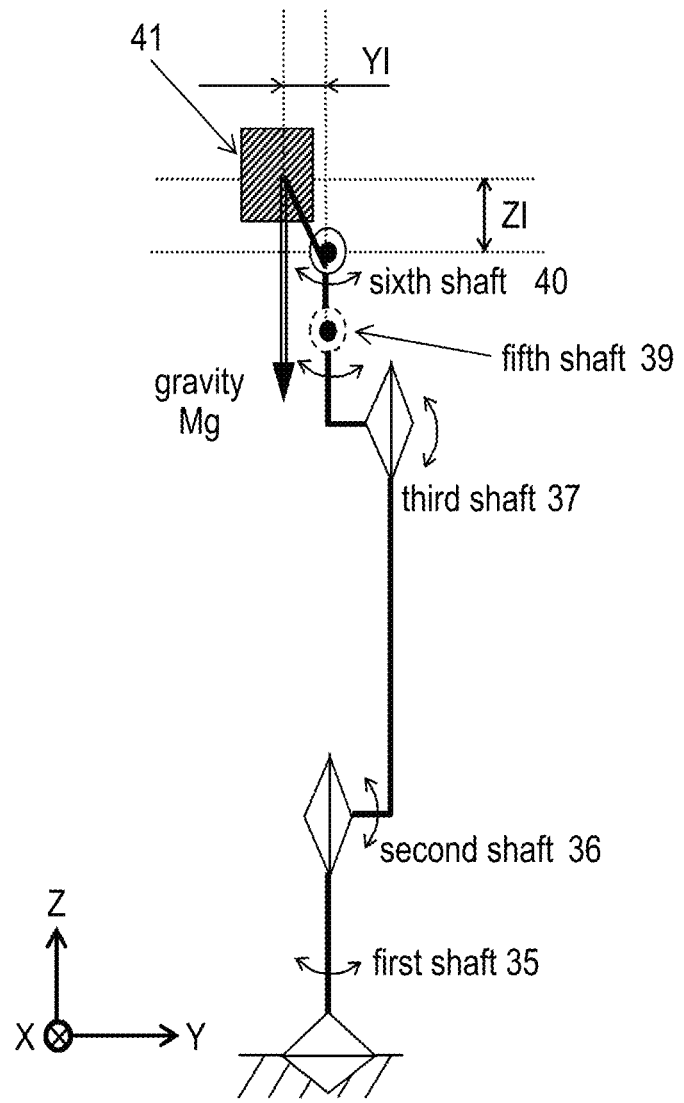
FIG. 3 shows an example of the placement of the rotary shafts of the robot in the YZ plane according to the exemplary embodiments of the present invention.

The present exemplary embodiment will describe a robot including the following rotary shafts: first shaft 35, second shaft 36, third shaft 37, fourth shaft 38 (second rotary shaft), fifth shaft 39 (third rotary shaft) and sixth shaft 40 (first rotary shaft) as shown in the XZ plane of FIG. 2 and the YZ plane of FIG. 3. This robot also includes the same number of arms as the rotary shafts. These arms rotate around the respective rotary shafts. For example, fourth shaft arm 48 rotates around fourth shaft 38, fifth shaft arm 49 rotates around fifth shaft 39 and sixth shaft arm 50 rotates around sixth shaft 40. The robot is a six-axis vertical articulated robot. First shaft 35 is nearest to the contact area between the robot and the ground, whereas sixth shaft 40 is located at the distal end of the robot. The XY plane is parallel to the contact area, whereas the Z direction is orthogonal to the contact area.

In FIGS. 2 and 3, distances X1, Y1 and Z1 represent components X, Y and Z, respectively, of the shortest distance (load offset) from the rotation center of sixth shaft 40 to the position of the center of gravity of load 41 applied to the distal end of sixth shaft arm 50.

In FIG. 2, arm lengths Lii and Lj represent the components Z and X, respectively, of the distance from the rotation center of fifth shaft 39 to the rotation center of sixth shaft 40 (the arm length of fifth shaft arm 49). In the present exemplary embodiment, as shown in FIG. 3, the rotation center of fifth shaft 39 and the rotation center of sixth shaft 40 are aligned with each other and are parallel to the Z direction. The component Y of the arm length of fifth shaft arm 49 is zero.

Of these dimensions, the distances X1, Y1 and Z1 determined from the position of the center of gravity of load 41 are unknowns. The arm lengths Lii and Lj related to fifth shaft 39 and sixth shaft 40, respectively, are known quantities that can be previously calculated from the structure of the robot.

FIG. 4A illustrates the third to sixth shafts viewed from the XZ plane as in FIG. 2. FIG. 4B illustrates the fourth to sixth shafts viewed from the YZ plane as in FIG. 3. The diagram of FIG. 4B is exaggerated to make it easier to see than in FIG. 4A.

In FIG. 4A, distance L5 represents the length from the rotation center of fifth shaft 39 to the position of the center of gravity of load 41. In FIG. 4B, distance L6 represents the length from the rotation center of sixth shaft 40 to the position of the center of gravity of load 41. The distance L5 can be calculated from the arm lengths Lii, Lj and the distances X1, Z1. The distance L6 can be calculated from the distances Y1 and Z1.

When load 41 is applied to the distal end of sixth shaft arm 50 of the robot, the gravitational torque of load 41 applied to sixth shaft 40, which is located at the distal end of the robot, will be calculated as follows.

Figure 1:
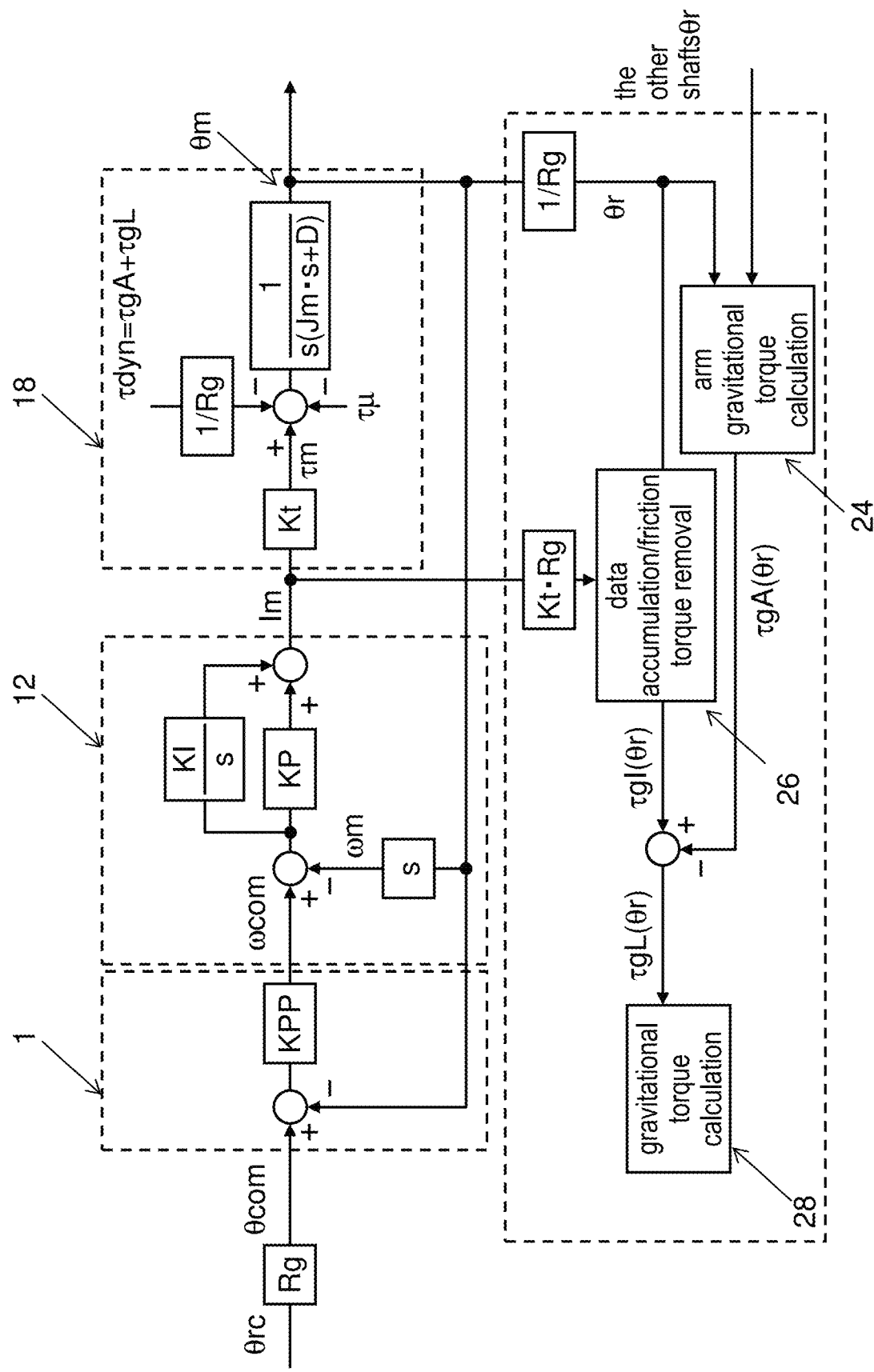
FIG. 1 is a block diagram illustrating a method for controlling the rotary shafts of a robot according to the exemplary embodiments of the present invention.

FIG. 1 is a block diagram illustrating a method for controlling the rotary shafts of the robot. The control shown in this block diagram is performed in an unillustrated robot controller. The control of the multiple shafts of the robot should be illustrated in multiple block diagrams; however, for simplicity, the block diagram shown in FIG. 1 represents the single block diagram to control the single shaft.

In position control block 1 shown in FIG. 1, a joint angle command θrc of the robot is multiplied by a velocity reduction ratio Rg to obtain a motor position command θcom. The difference value between the motor position command θcom and a motor position feedback θm is multiplied by a position proportional gain KPP to generate a velocity loop command ωcom.

In speed control block 12 shown in FIG. 1, a motor current command Im is generated using the following values: the difference value between the velocity loop command ωcom and a motor speed feedback ωm; a velocity proportional gain KP; and a velocity integral gain KI.

In kinetic control block 18 of FIG. 1 illustrating the motor and external forces, assume that the reduction gear is a rigid body. In this case, a motor generating torque τm is expressed by Mathematical Formula 1 when viewed from the motor driver, and is expressed by Mathematical Formula 2 when viewed from the load.

$$\tau m = Kt \cdot Im \qquad \text{[Mathematical Formula 1]}$$

$$\tau m = Jm \cdot \alpha m + D \cdot \omega m + \tau \mu + \tau dyn/Rg \qquad \text{[Mathematical Formula 2]}$$

The following shows the meaning of the symbols used in Mathematical Formulas 1 and 2.

Kt: motor torque constant
Im: motor current
αm: motor angular acceleration (the derivative value of ωm)
ωm: motor angular velocity
Jm: motor inertia (the sum of the inertia of the rotor and the inertia viewed from the primary side of the reduction gear is converted to the inertia viewed from the secondary side of the reduction gear)
D: viscous friction coefficient
τμ: friction torque
τdyn: kinetic torque (the sum of gravitational torque, inertia force, centrifugal force and Coriolis force)
Rg: the velocity reduction ratio of the reduction gear The friction torque τμ can be calculated by Mathematical Formula 3 below.

$$\tau\mu = K\mu \cdot sgn \qquad \text{[Mathematical Formula 3]}$$

where Kμ represents the magnitude of the dynamical friction.

$$sgn = \begin{cases} 1 & (\omega m > 0) \\ 0 & (\omega m = 0) \\ -1 & (\omega m < 0) \end{cases} \qquad \text{[Mathematical Formula 4]}$$

The kinetic torque τdyn in Mathematical Formula 2 can be approximated as a gravitational torque component because the inertia force, the centrifugal force and the Coriolis force due to the angular velocity and the angular acceleration are negligible when the shaft is rotated at low and constant angular velocity. Thus, the kinetic torque τdyn can be expressed by Mathematical Formula 5 below.

$$\tau dyn = \tau gA[\theta r] + \tau gL[\theta r] \qquad \text{[Mathematical Formula 5]}$$

where
θr represents the robot joint angle (the output angle of the reduction gear)=θm/Rg,
τgA[θr] represents the gravitational torque caused by the robot arm, and
τgL[θr] represents the gravitational torque caused by the load which is applied to the robot.

Both of the gravitational torques are uniquely determined by the robot joint angle θr.

The masses and shapes of the arms and other components of the robot are already known.

The gravitational torque τgA[θr] caused by the robot arm can be calculated if the joint angles of all the shafts of the robot are known.

Arm gravitational torque calculation block 24 shown in FIG. 1 receives the robot joint angle θr of the shaft and the robot joint angle θr of the other shafts at a standstill. The gravitational torque τgA[θr] caused by the robot arm is calculated from the masses and shapes of the arms and other components of the robot.

When the shaft rotated at a constant angular velocity, the motor angular acceleration αm is zero. The gravitational torque τgL[θr] of the load can be calculated from Mathematical Formula 6 below, which is derived from Mathematical Formulas 1 to 5.

$$\tau gL[\theta r] = \{Kt \cdot Im[\theta r] - D \cdot \omega m - K\mu \cdot sgn\} \cdot Rg - \tau gA[\theta r]$$
[Mathematical Formula 6]

If the motor current obtained when the shaft is rotated at a constant angular velocity counterclockwise (sgn=−1) at −ωm0 is referred to as Im[θr]m, Mathematical Formula 6 is converted to Mathematical Formula 7. Meanwhile, if the motor current obtained when the shaft is rotated at a constant angular velocity clockwise (sgn=1) at ωm0 is referred to as Im[θr]p, Mathematical Formula 6 is converted to Mathematical Formula 8.

$$\tau gL[\theta r] = \{Kt \cdot Im[\theta r]m + D \cdot \omega m0 + K\mu\} \cdot Rg - \tau gA[\theta r]$$
[Mathematical Formula 7]

$$\tau gL[\theta r] = \{Kt \cdot Im[\theta r]p - D \cdot \omega m0 - K\mu\} \cdot Rg - \tau gA[\theta r]$$
[Mathematical Formula 8]

Adding Mathematical Formulas 7 and 8, and dividing the sum by 2 results in Mathematical Formula 9.

$$\tau gL[\theta r] = \qquad \text{[Mathematical Formula 9]}$$
$$Kt \cdot Rg \cdot \{Im[\theta r]p + Im[\theta r]m\}/2 - \tau gA[\theta r] =$$
$$\tau gI[\theta r] - \tau gA[\theta r]$$

The definitional equation is shown in Mathematical Formula 10 below.

$$\tau gI[\theta r] = Kt \cdot Rg \cdot \{Im[\theta r]p + Im[\theta r]m\}/2 \qquad \text{[Mathematical Formula 10]}$$

Thus, the load is rotated clockwise and counterclockwise at low and constant angular velocity. While the load is rotated counterclockwise, the data of the robot joint angle θr and the motor current command Im[θr]m at this angle are accumulated. Meanwhile, while the load is rotated clockwise, the data of the robot joint angle θr and the motor current command Im[θr]p at this angle are accumulated. After the clockwise and counterclockwise rotations at a predetermined angle Δθr, the same joint angles θr can be averaged between the clockwise and counterclockwise directions (the angles are added and divided by 2) to remove the terms related to the friction force. Hence, the gravitational torque τgL[θr] can be calculated without calculating the viscous friction coefficient D and the dynamical friction Kμ.

This method, however, cannot be applied when the magnitude of the effects of the dynamical friction differs depending on the rotation direction. One such example is a robot with rotary shafts linked to reduction gears such as hypoid gears having a structural feature.

In this type of robot, Mathematical Formulas 7 and 8 are converted to Mathematical Formulas 11 and 12, respectively.

$$\tau gL[\theta r]=\{Kt\cdot Im[\theta r]m+D\cdot\omega m0+K'\mu\}\cdot Rg-\tau gA[\theta r]$$
[Mathematical Formula 11]

$$\tau gL[\theta r]=\{Kt\cdot Im[\theta r]p-D\omega m0-K'\mu_+\}\cdot Rg-\tau gA[\theta r]$$
[Mathematical Formula 12]

The following shows the meaning of the symbols used in Mathematical Formulas 11 and 12.

K'μ−: the magnitude of the dynamical friction during the counterclockwise rotation K'μ+: the magnitude of the dynamical friction during the clockwise rotation.

Adding Mathematical Formulas 11 and 12, and dividing the sum by 2 results in Mathematical Formula 13.

$$\tau gL[\theta r] = Kt\cdot Rg\cdot\{Im[\theta r]p + Im[\theta r]m\}/2 +$$
$$\{K'\mu_- - K'\mu_+\}\cdot Rg/2 - \tau gA[\theta r] =$$
$$\tau gI[\theta r] - \tau gA[\theta r] + \{K'\mu_- - K'\mu_+\}\cdot Rg/2$$
[Mathematical Formula 13]

The definitional equation is shown in Mathematical Formula 14 below.

$$\tau gI[\theta r]=Kt\cdot Rg\cdot\{Im[\theta r]p+Im[\theta r]m\}/2$$
[Mathematical Formula 14]

As shown in Mathematical Formula 13, the gravitational torque τgL[θr] cannot be calculated without finding the magnitude of the dynamical friction in each of the clockwise and counterclockwise directions. However, it is difficult to actually measure or estimate the magnitude of the dynamical friction. Therefore, the gravitational torque τgL[θr] is preferably calculated by a method not susceptible to dynamical friction.

The method for controlling a robot according to the exemplary embodiment of the present invention is a method for controlling a robot including: sixth shaft 40 (first rotary shaft) and fourth shaft 38 (second rotary shaft) extending in the same direction; a first motor and a second motor configured to rotate sixth shaft 40 and fourth shaft 38, respectively; and sixth shaft arm 50 configured to be rotated around sixth shaft 40 and to hold load 41 directly or indirectly at the distal end of sixth shaft arm 50. The method includes: rotating fourth shaft 38 while vibrating sixth shaft 40 so as to rotate sixth shaft 40 relative to load 41; and calculating the gravitational torque of load 41 applied to sixth shaft 40 while sixth shaft 40 is being rotated relative to load 41 in the step of rotating fourth shaft 38.

First, as shown in FIGS. 5A to 5D, fourth shaft 38 is rotated at least 90 degrees so as to calculate the gravitational torque of load 41 applied to sixth shaft 40.

Figure 5A:
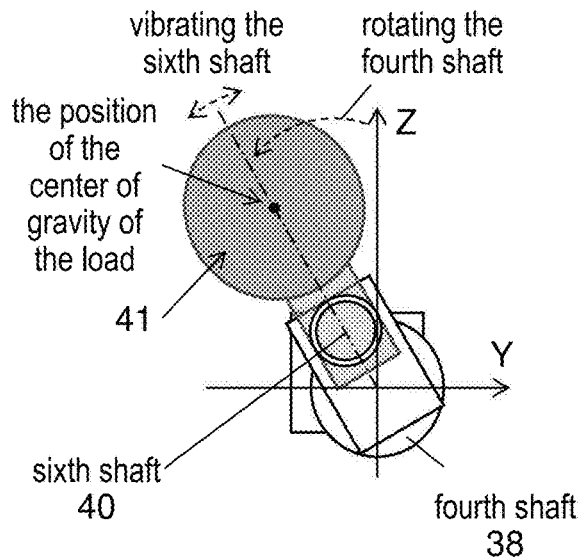
FIG. 5A illustrates the robot viewed from the YZ plane when the fourth shaft is in the fifth position.
Figure 5B:
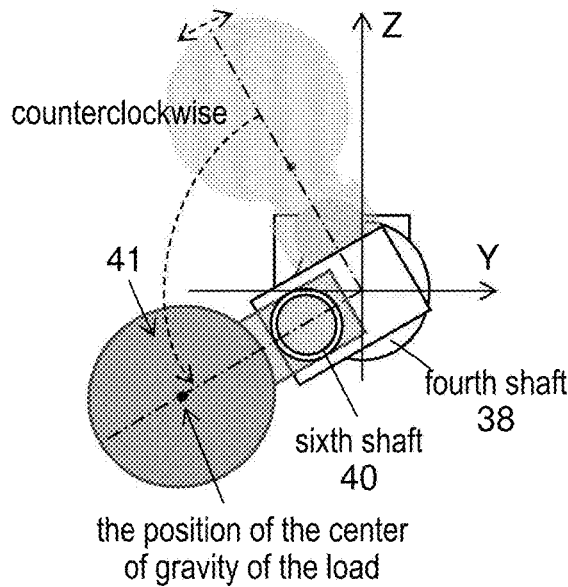
FIG. 5B illustrates the robot viewed from the YZ plane when the fourth shaft is in the sixth position, which is 90 degrees counterclockwise from the fifth position.
Figure 5C:
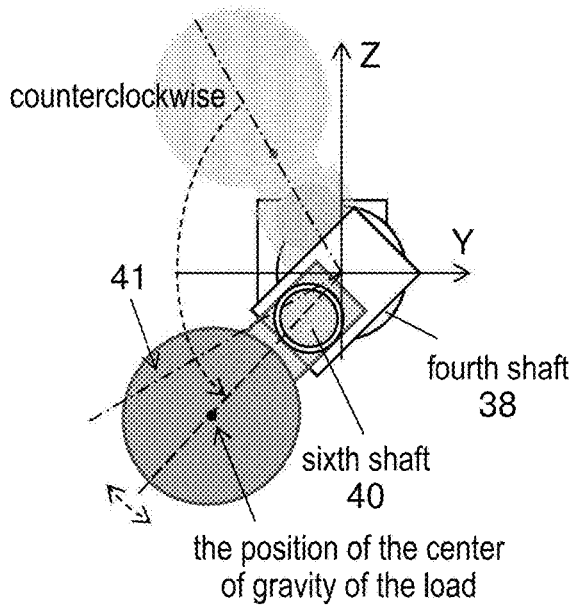
FIG. 5C illustrates the robot viewed from the YZ plane when the fourth shaft is in a position that is beyond the sixth position and that is at least 90 degrees counterclockwise from the fifth position.
Figure 5D:
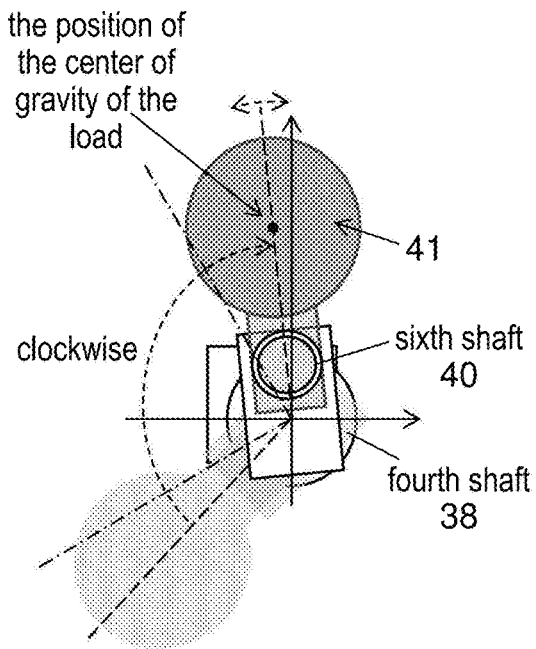
FIG. 5D illustrates the robot viewed from the YZ plane when the fourth shaft is in a position that is beyond the sixth and fifth positions and that is at least 90 degrees clockwise from the position shown in FIG. 5C.

FIG. 5A shows fourth shaft 38 in the fifth position. FIG. 5B shows fourth shaft 38 in the sixth position, which is 90 degrees counterclockwise from the fifth position. FIG. 5C shows fourth shaft 38 in a position that is beyond the sixth position and that is at least 90 degrees counterclockwise from the fifth position. FIG. 5D shows fourth shaft 38 in a position that is beyond the sixth and fifth positions and that is at least 90 degrees clockwise from the position shown in FIG. 5C. As shown in FIGS. 5A to 5D, the joint angle (hereinafter, also referred to as the operating angle) of sixth shaft 40 is substantially constant with reference to fourth shaft 38 in rotation. In short, sixth shaft 40 is not rotating substantially when seen from fourth shaft 38. The term "substantially" is used because sixth shaft 40 is being slightly vibrated as will be described later. Meanwhile, the operating angle of sixth shaft 40 coincides with the operating angle of fourth shaft 38 with reference to the YZ plane (the contact area between the robot and the ground). In other words, sixth shaft 40 is rotating synchronously with fourth shaft 38 when seen from the contact area between the robot and the ground. Therefore, when the contact area between the robot and the ground is used as a reference point, the operating angle of fourth shaft 38 can be equated with the operating angle of sixth shaft 40.

To rotate fourth shaft 38, sixth shaft 40 is vibrated to eliminate the effects of the static friction of sixth shaft 40 as shown in FIG. 5A. Vibrating is the clockwise and counterclockwise rotations around the joint angle, which coincides with the joint angle of fourth shaft 38. The vibration amplitude of sixth shaft 40 is smaller than the rotation amplitude of fourth shaft 38 in the clockwise and counterclockwise directions. The vibration time period of sixth shaft 40 is smaller than the rotation time period of fourth shaft 38 in the clockwise and counterclockwise directions. The vibration center of sixth shaft 40 coincides with the joint angle of fourth shaft 38, and the vibration amplitude and time period are so small that sixth shaft 40 can be regarded as not being rotating substantially by itself. In other words, sixth shaft 40 can be regarded as not being rotating substantially when seen from fourth shaft 38. When not rotating substantially by itself, sixth shaft 40 is unsusceptible to dynamical and viscous frictions. Meanwhile, when being vibrated, sixth shaft 40 is unsusceptible to static friction. This enables correct calculation of the gravitational torque of load 41 applied to sixth shaft 40. To be more specific, the following values are measured: the magnitude of the motor current flowing to the motor to drive sixth shaft 40, and the operating angle of fourth shaft 38, which can be equated with the operating angle of sixth shaft 40. The result of the measurement is substituted into the first term on the right side of Mathematical Formula 6. Since sixth shaft 40 is unsusceptible to viscous and dynamical frictions, the second and third terms on the right side of Mathematical Formula 6 are negligible. The fourth term on the right side of Mathematical Formula 6 is already known. This enables calculation of the gravitational torque τgL(θr) of load 41 applied to sixth shaft 40.

Fourth shaft 38 is preferably rotated at low and constant angular velocity so to make the inertia force, the centrifugal force and the Coriolis force as small as negligible. Meanwhile, if fourth shaft 38 is rotated at high speed, the shaft may be subjected to the inertia force, the centrifugal force and the Coriolis force due to the angular velocity and the angular acceleration, possibly making it impossible to calculate an accurate gravitational torque.

The rotation amplitude of fourth shaft 38 in the clockwise and counterclockwise directions is preferably in the range of 90 degrees or more including the fifth and sixth positions (hereinafter, the predetermined range). Since fourth shaft 38 is in rotation when it is in the fifth and sixth positions, the gravitational torque of load 41 can be calculated without being affected by the backlash of the reduction gear.

Figure 6:
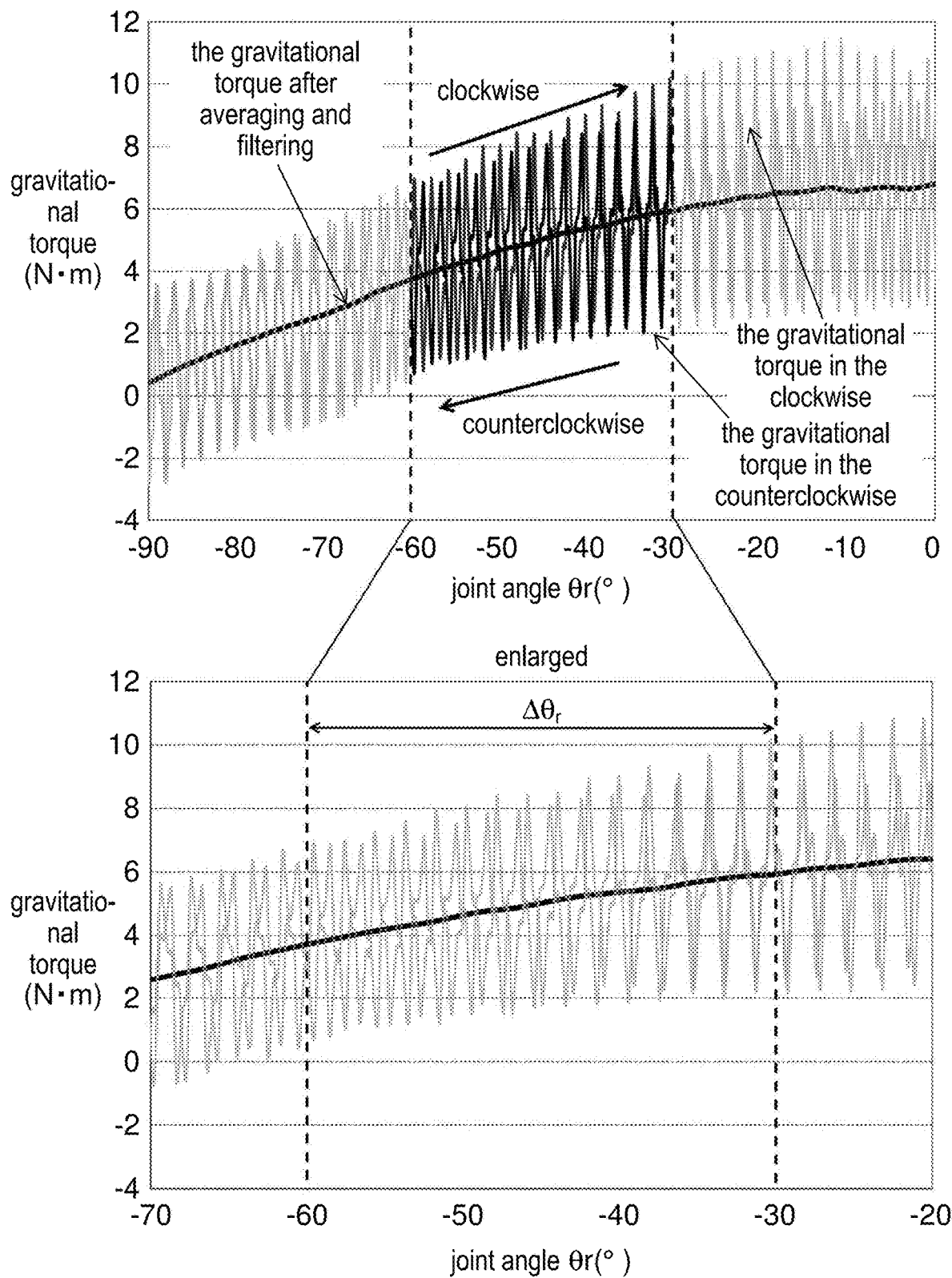
FIG. 6 shows an example of the gravitational torque applied to the sixth shaft when the fourth shaft is rotated at a constant angular velocity as shown in FIGS. 5A to 5D.

As shown in FIG. 6, the gravitational torque calculated by Mathematical Formula 6 may be subjected to filtering so as to remove vibrational components, thereby improving the calculation accuracy of the torque. The operating angle of fourth shaft 38 that is actually rotating is equated with the operating angle of sixth shaft 40 that is being vibrated with the load applied. A correlation is established between the above-obtained gravitational torque of load 41 applied to sixth shaft 40 and the operating angle of fourth shaft 38, which has been equated with the operating angle of sixth shaft 40. Fourth shaft 38 is rotated clockwise and counterclockwise. The data of the gravitational torque of load 41 obtained during the clockwise rotation and the data obtained during the counterclockwise rotation are accumulated. The same operating angles can be averaged between the clockwise and counterclockwise directions so as to further improve the calculation accuracy of the gravitational torque of load 41.

Figure 7:
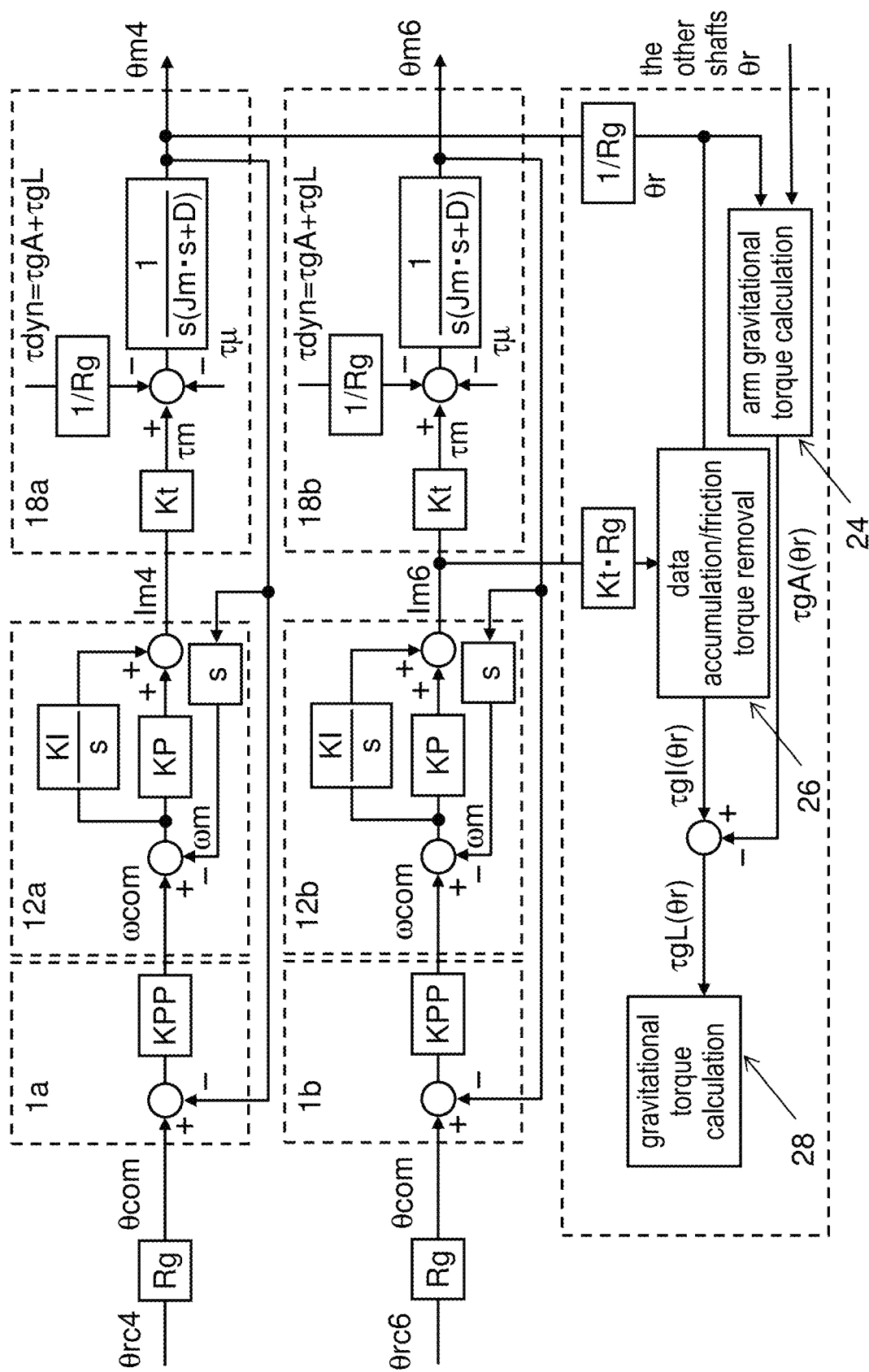
FIG. 7 is a block diagram showing a method for controlling the rotary shafts of the robot according to the exemplary embodiments of the present invention.

FIG. 7 is a block diagram showing a method for robot control. Fourth shaft 38 is controlled by position control block 1a, speed control block 12a and kinetic control block 18a. Sixth shaft 40 is controlled by position control block 1b, speed control block 12b and kinetic control block 18b.

Position control blocks 1a and 1b operate in the same manner as position control block 1 of FIG. 1. Position control block 1a receives a joint angle command θrc4 to rotate fourth shaft 38 clockwise and counterclockwise at low and constant angular velocity in the predetermined range. Position control block 1b receives a joint angle command θrc6 to vibrate sixth shaft 40.

Speed control blocks 12a and 12b operate in the same manner as speed control block 12 of FIG. 1. Speed control block 12a generates the motor current command Im4 of the motor to drive fourth shaft 38. Speed control block 12b generates the motor current command Im6 of the motor to drive sixth shaft 40.

Kinetic control blocks 18a and 18b operate in the same manner as kinetic control block 18 of FIG. 1. Kinetic control block 18a generates a motor position command θm4 of the motor to drive fourth shaft 38. Kinetic control block 18b generates a motor position command θm6 of the motor to drive sixth shaft 40.

Arm gravitational torque calculation block 24 calculates a gravitational torque τgA(θr) applied to the arm based on the robot joint angle (the operating angle) of fourth shaft 38 and the robot joint angle of the other shafts. Data accumulation/friction torque removal block 26 accumulates the data of the operating angle θr of fourth shaft 38 and the data of the driving torque τgI(θr) of sixth shaft 40.

Gravitational torque calculation block 28 calculates the gravitational torque τgL(θr) of load 41 applied to sixth shaft 40 based on the driving torque τgI(θr) and the gravitational torque τgA(θr) caused by the robot arm. The gravitational torque τgL(θr) of load 41 applied to sixth shaft 40 is a function of the operating angle θr of fourth shaft 38. In other words, a correlation is established between the calculated gravitational torque applied to sixth shaft 40 and the operating angle of fourth shaft 38.

Gravitational torque calculation block 28 may apply filtering and averaging as shown in FIG. 6 to the gravitational torque at each operating angle.

This is how the gravitational torque of load 41 applied to sixth shaft 40 is calculated. This method does not substantially rotate sixth shaft 40, and instead, rotates fourth shaft 38 extending in the same direction as sixth shaft 40 so as to rotate sixth shaft 40 relative to load 41. This method also vibrates sixth shaft 40 while rotating fourth shaft 38.

This method ensures the correct calculation of the gravitational torque of load 41 applied directly or indirectly to the distal end of sixth shaft arm 50 rotating around sixth shaft 40 even when dynamical and viscous frictions have different effects depending on the rotation direction of sixth shaft 40.

Second Exemplary Embodiment

According to the first exemplary embodiment, the gravitational torque of an applied load can be calculated without being affected by dynamical friction. One application of the obtained gravitational torque is to estimate the mass M and the position of the center of gravity of the load. According to the method disclosed in Patent Literature 2 shown in BACKGROUND ART, the gravitational torque of the load applied to two rotary shafts orthogonal to each other is calculated to calculate the mass and the position of the center of gravity of the load. In the present exemplary embodiment, the method of the first exemplary embodiment and the method of Patent Literature 2 are combined to calculate the mass and the position of the center of gravity of a load with high precision without being affected by dynamical friction.

First, a method for calculating the gravitational torque of load 41 applied to fifth shaft 39 will be described, which is the same as in Patent Literature 2. The gravitational torque of fifth shaft 39 is calculated at the second position and the fourth position, which is 90 degrees from the second position. The second position is where fifth shaft arm 49 rotating around fifth shaft 39 is in the horizontal position. To actually calculate the gravitational torque, fifth shaft 39 is rotated clockwise and counterclockwise at a constant angular velocity in the range including the second and fourth positions.

Figure 8A:
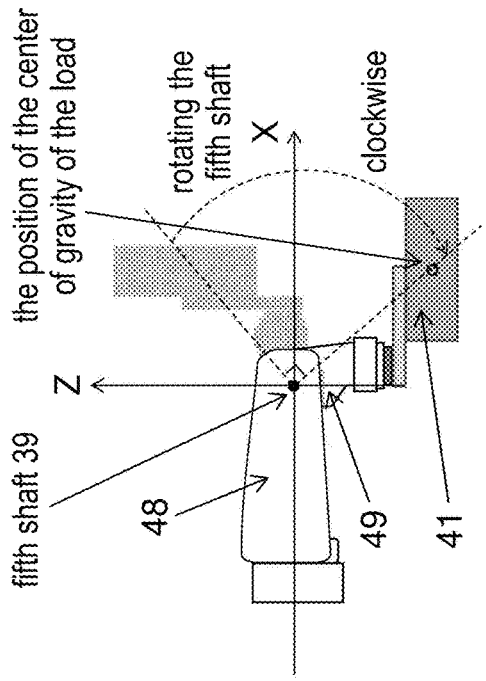
FIG. 8A illustrates the robot viewed from the XZ plane when the fifth shaft is in the second position.
Figure 8B:
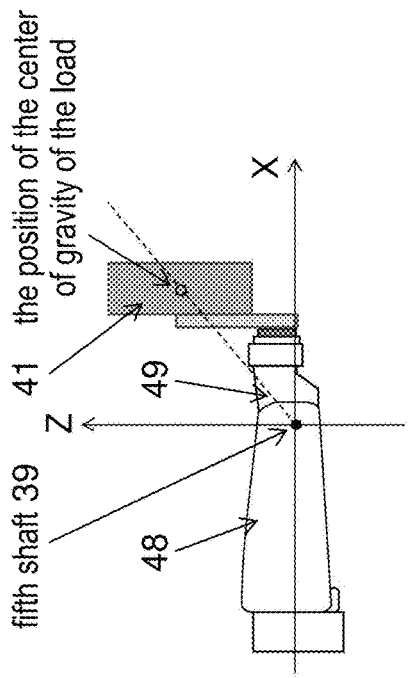
FIG. 8B illustrates the robot viewed from the XZ plane when the fifth shaft is in the fourth position, which is 90 degrees clockwise from the second position.
Figure 8C:
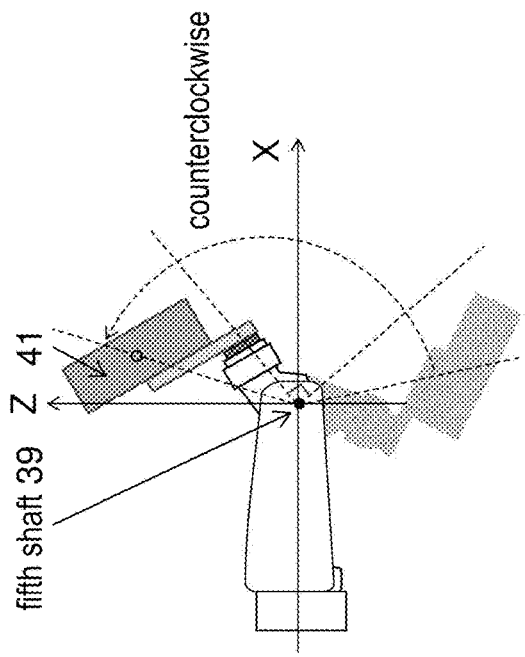
FIG. 8C illustrates the robot viewed from the XZ plane when the fifth shaft is in a position that is beyond the fourth position and that is at least 90 degrees clockwise from the second position.
Figure 8D:
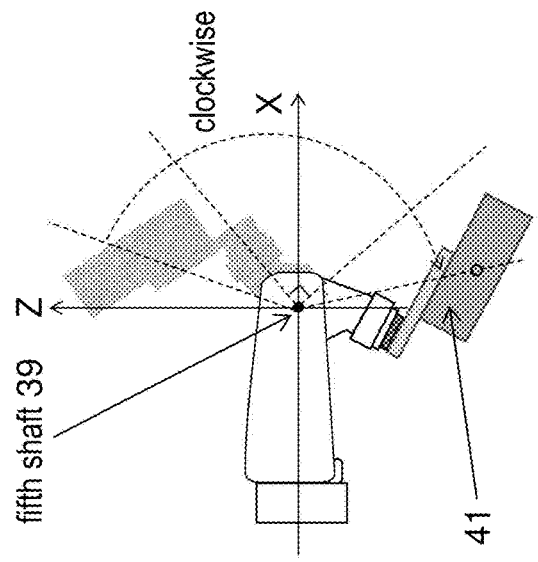
FIG. 8D illustrates the robot viewed from the XZ plane when the fifth shaft is in a position that is beyond the fourth and second positions and that is at least 90 degrees counterclockwise from the position shown in FIG. 8C.

FIG. 8A illustrates fifth shaft 39 in the second position (fifth shaft arm 49 rotating around fifth shaft 39 is in the horizontal position). FIG. 8B illustrates fifth shaft 39 in the fourth position, which is 90 degrees clockwise from the second position. FIG. 8C illustrates fifth shaft 39 in a position that is beyond the fourth position and that is at least 90 degrees clockwise from the second position. FIG. 8D illustrates fifth shaft 39 in a position that is beyond the fourth and second positions and that is at least 90 degrees counterclockwise from the position shown in FIG. 8C.

During the clockwise and counterclockwise rotations shown in FIGS. 8A to 8D, each of the gravitational torques of load 41 applied to fifth shaft 39 in the second and fourth positions is calculated by Mathematical Formulas 7, 8, 9 and 10 shown above.

Next, the mass M of load 41 and the distances X1, Y1 and Z1 determined from the position of the center of gravity of load 41 will be calculated by using the following: the gravitational torque of load 41 applied to sixth shaft 40 calculated in the first exemplary embodiment, and the gravitational torque of load 41 applied to fifth shaft 39 calculated in Patent Literature 2.

The mass and the gravitational acceleration of load 41 are referred to as M and g, respectively. The gravitational torque T1 of load 41 applied to fifth shaft 39 in the second position is expressed by Mathematical Formula 15, considering the distance L5 (see FIG. 4A) from the rotation center of fifth shaft 39 to the position of the center of gravity of load 41. The gravitational torque T2 of load 41 applied to fifth shaft 39 in the fourth position is expressed by Mathematical Formula 16.

The second and fourth positions are orthogonal to each other, so that Mathematical Formulas 15 and 16 shown below can be derived.

$$T1 = M \cdot g \cdot (X1 + Lj) \qquad \text{[Mathematical Formula 15]}$$

$$T2 = M \cdot g \cdot (Z1 + Lii) \qquad \text{[Mathematical Formula 16]}$$

Similarly, the gravitational torque T3 of load 41 applied to sixth shaft 40 when sixth shaft 40 and fourth shaft 38 are in the first position can be expressed by Mathematical Formula 17 below, considering the distance L6 (see FIG. 4B) from the rotation center of sixth shaft 40 to the position of the center of gravity of load 41. The gravitational torque T4 of load 41 applied to sixth shaft 40 when sixth shaft 40 and fourth shaft 38 are in the third position, which is 90 degrees from the first position can be expressed by Mathematical Formula 18 below.

$$T3 = M \cdot g \cdot Y1 \qquad \text{[Mathematical Formula 17]}$$

$$T4 = M \cdot g \cdot Z1 \qquad \text{[Mathematical Formula 18]}$$

The joint angle of each shaft of general robots is detected by a rotational position detector such as an encoder attached to each shaft. Hence, the joint angle of fifth shaft 39 at which fifth shaft arm 49 is set in the horizontal position can be detected by the rotational position detector. When load 41 is in the first position, the joint angle of sixth shaft 40 is zero degrees, which is the start position or the horizontal position. Therefore, the gravitational torques T1, T2, T3 and T4 of load 41 can be calculated based on Mathematical Formulas 1 through 14.

Furthermore, Mathematical Formulas 16 and 18 lead to Mathematical Formula 19 shown below.

$$M = (T2 - T4)/(g \cdot Lii) \qquad \text{[Mathematical Formula 19]}$$

Mathematical Formula 19 describes the mass M of load 41.

The mass M calculated by Mathematical Formula 19 can be substituted into Mathematical Formula 15 to calculate the distance X1, substituted into Mathematical Formula 17 to calculate the distance Y1, and substituted into Mathematical Formula 16 or 18 to calculate the distance Z1.

As described above, the gravitational torques of load 41 applied to sixth shaft 40 (first rotary shaft) of the first exemplary embodiment and applied to fifth shaft 39 (third rotary shaft) of the second exemplary embodiment are calculated at the predetermined positions (the first and second positions) and the positions (the third and fourth positions), which are 90 degrees from the predetermined positions.

To be more specific, the method disclosed in the first exemplary embodiment is used to calculate the gravitational torques of load 41 when fourth shaft 38 whose operating angle is equated with that of sixth shaft 40 is in the first position as well as in the third position, which is 90 degrees from the first position. Furthermore, the method described in the second exemplary embodiment is used to calculate the gravitational torques of load 41 by rotating fifth shaft 39 at least 90 degrees clockwise and counterclockwise at a constant angular velocity. The gravitational torques of load 41 are calculated when fifth shaft 39 is in the second position as well as in the fourth position, which is 90 degrees from the second position. Furthermore, the mass and the position of the center of gravity of load 41 can be easily calculated by using the following values: the gravitational torques of load 41 calculated when fourth shaft 38 whose operating angle is equated with that of sixth shaft 40 is in the first position as well as in the third position; the gravitational torques of load 41 calculated when fifth shaft 39 is in the second position as well as in the fourth position; and the shortest inter-axis distances (Lj, Lii) between the rotation center of sixth shaft 40 and the rotation center of fifth shaft 39. This enables accurate calculation of the gravitational torque of the load applied to the motor-driven robot and the mass and the position of the center of gravity of the load.

INDUSTRIAL APPLICABILITY

The present invention provides a method for accurately calculating the gravitational torque of the load applied to a motor-driven robot. This invention improves both the weight estimation of the load and the sensitivity of the collision detection function. This invention contributes to the expansion of the application of robots and to the quality improvement of welding and other operations that should be precisely performed with higher quality.

REFERENCE MARKS IN THE DRAWINGS

1, 1a, 1b position control block
12, 12a, 12b speed control block
18, 18a, 18b kinetic control block
24 arm gravitational torque calculation block
26 data accumulation/friction torque removal block
28 gravitational torque calculation block
35 first shaft
36 second shaft
37 third shaft
38 fourth shaft
39 fifth shaft
40 sixth shaft
41 load
48 fourth shaft arm
49 fifth shaft arm
50 sixth shaft arm
M mass

The invention claimed is:

1. A method for controlling a robot, the robot including:
   a first rotary shaft and a second rotary shaft extending in a same direction,
   a first motor and a second motor configured to rotate the first rotary shaft and the second rotary shaft, respectively; and
   an arm configured to be rotated around the first rotary shaft and to hold a load directly or indirectly at a distal end of the arm,
   the method comprising:
   rotating the second rotary shaft at least 90 degrees at a constant angular velocity, and vibrating the first rotary shaft so as to rotate the first rotary shaft relative to the load;

calculating a gravitational torque of the load applied to the first rotary shaft while the first rotary shaft is being rotated relative to the load in the step of rotating the second rotary shaft;

equating an operating angle of the second rotary shaft with an operating angle of the first rotary shaft rotated relative to the load in the step of rotating the second rotary shaft so as to establish a correlation between the gravitational torque calculated in the step of calculating the gravitational torque and the operating angle of the second rotary shaft.

2. The method according to claim 1, wherein the robot further includes a third rotary shaft located between the first rotary shaft and the second rotary shaft, the third rotary shaft extending in a different direction from the first rotary shaft and the second rotary shaft, the step of calculating the gravitational torque comprises calculating following:
- a gravitational torque of the load when the second rotary shaft is in a first position, the second rotary shaft having an operating angle equated with an operating angle of the first rotary shaft; and
- a gravitational torque of the load when the second rotary shaft is rotated to a third position, the third position being 90 degrees from the first position, and the method further comprises:

rotating the third rotary shaft clockwise and counterclockwise by at least 90 degrees at a constant angular velocity;

calculating following:
- a gravitational torque of the load when the third rotary shaft is rotated to a second position in the step of rotating the third rotary shaft; and
- a gravitational torque of the load when the third rotary shaft is rotated to a fourth position in the step of rotating the third rotary shaft, the fourth position being 90 degrees from the second position; and calculating a mass and a position of a center of gravity of the load by using following:
- the gravitational torques of the load calculated when the second rotary shaft is in the first position and in the third position;
- the gravitational torques of the load calculated when the third rotary shaft is in the second position and in the fourth position; and
- a shortest inter-axis distance between a rotation center of the first rotary shaft and a rotation center of the third rotary shaft.

* * * * *